April 29, 1958 V. J. TARANIK 2,832,278
APPARATUS FOR SMOKE-CURING MEATS
Filed Aug. 2, 1954 3 Sheets-Sheet 1
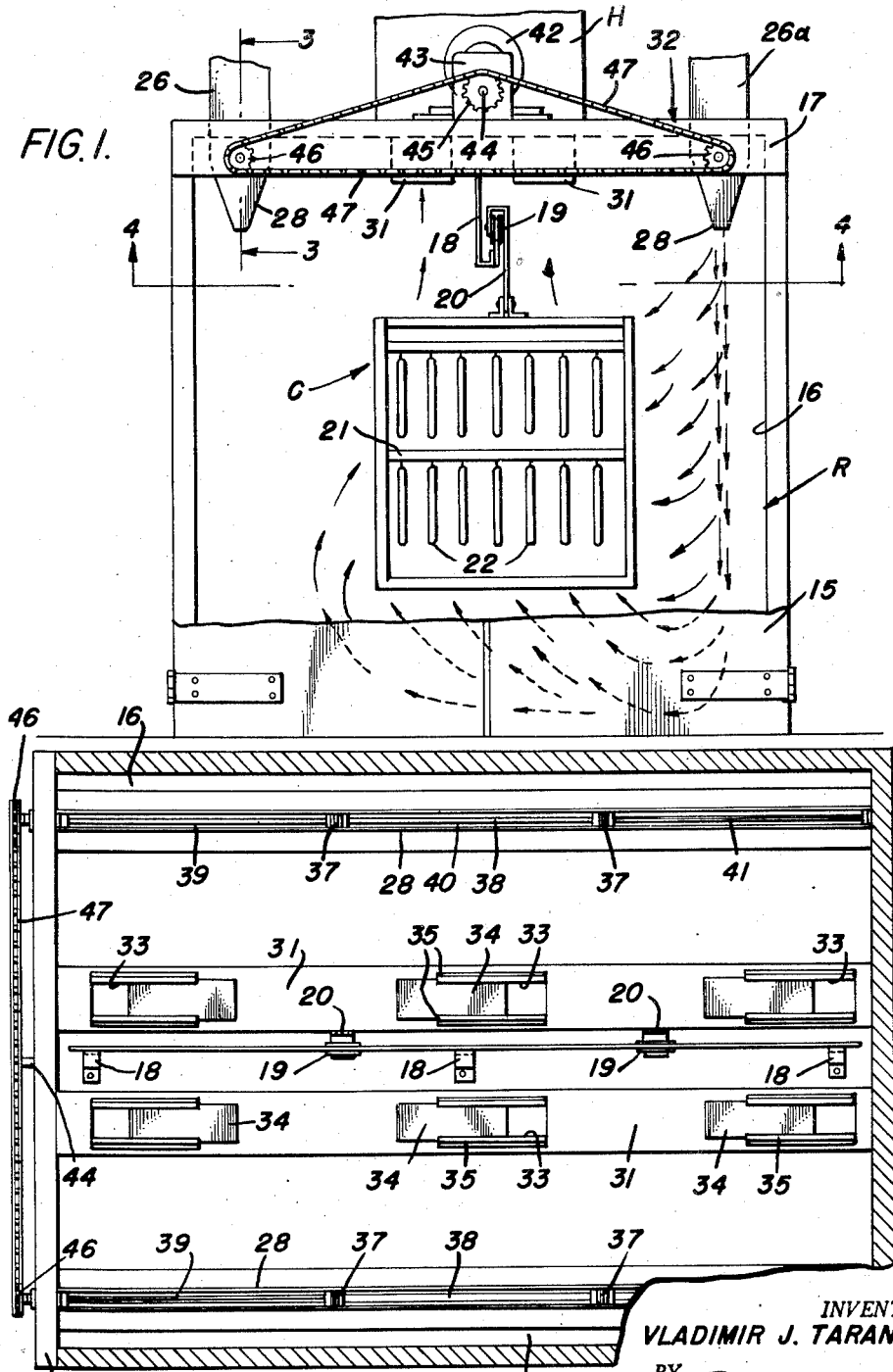
INVENTOR.
VLADIMIR J. TARANIK
BY
Attorney April 29, 1958   V. J. TARANIK   2,832,278
APPARATUS FOR SMOKE-CURING MEATS
Filed Aug. 2, 1954   3 Sheets-Sheet 2
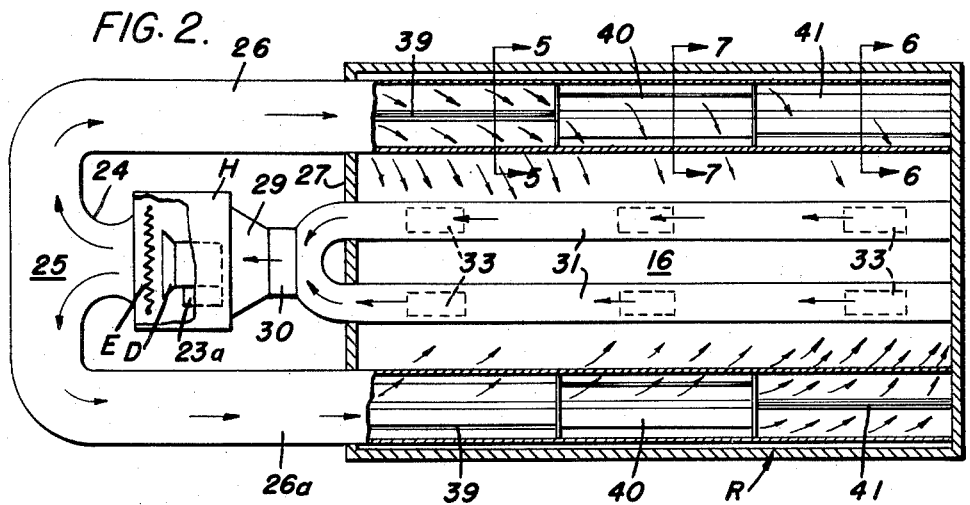
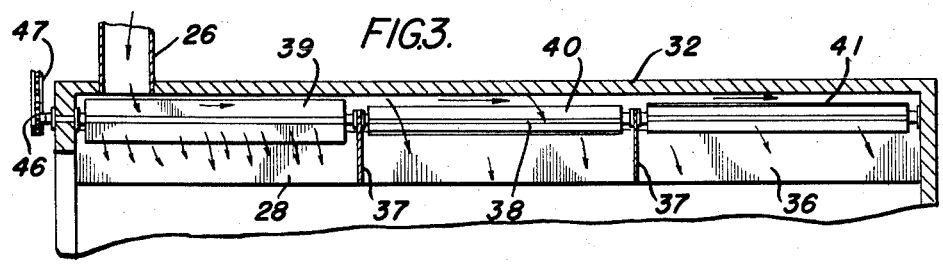
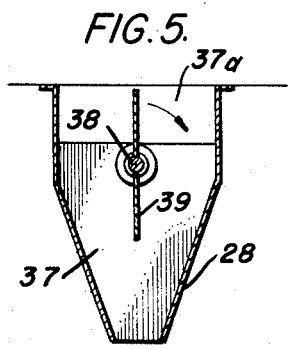
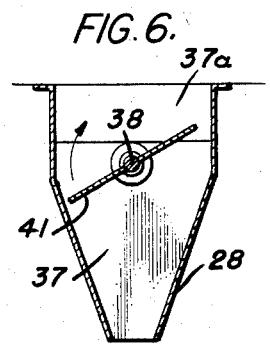
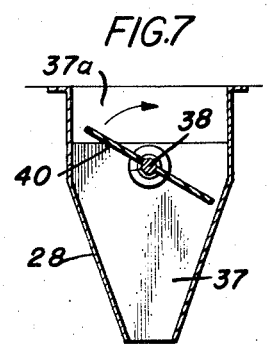
VLADIMIR J. TARANIK
INVENTOR.
BY
Attorney April 29, 1958 — V. J. TARANIK — 2,832,278
APPARATUS FOR SMOKE-CURING MEATS
Filed Aug. 2, 1954 — 3 Sheets-Sheet 3

VLADIMIR J. TARANIK
INVENTOR

BY
ATTORNEY

United States Patent Office

2,832,278
Patented Apr. 29, 1958

2,832,278

APPARATUS FOR SMOKE-CURING MEATS

Vladimir J. Taranik, La Habra Heights, Calif., assignor to National Food Equipment Co., Inc., Brea, Calif., a corporation of California Application August 2, 1954, Serial No. 447,253

2 Claims. (Cl. 99—259)

My invention relates to methods of and apparatus for the smoke-curing of meats and other foods. Under such methods and apparatus as heretofore proposed the meats are hung in a receptacle or oven to which smoke and air under pressure are supplied so as to circulate about the meats. In the smoke-curing process the temperature of the air as supplied to the receptacle is gradually increased from room temperature to the finishing temperature which varies from 170° F. to over 200° F. depending upon the nature of the meat being cured.

By reason of the manner of distribution or course of circulation of the heated air in relation to the meat, under prior methods it is practically impossible to establish and maintain uniform temperatures throughout all parts of the receptacle or smoke-oven. This results in overheating parts of the receptacle before the other parts can be brought to proper finishing temperature. As a consequence those meats located in the overheated receptacle parts become excessively heated and thus are caused to shrink to a degree such as to effect great loss in weight and hence in sales value. Moreover, the time required to smoke-cure a batch of meats is made excessive because of the failure to bring all parts of the receptacle to a uniform finishing temperature at the same time. Thus is not only more heat required for curing, but the number of meat batches that can be cured in any given time is minimized.

It is a purpose of my invention to provide a method of and apparatus for smoke-curing meats and other food products, by which uniform heated smoke-laden air under pressure can be supplied to and distributed in a receptacle to uniformly heat all parts thereof so as to bring all meats in the receptacle to a uniform finishing temperature at one and the same time, thereby preventing shrinkage losses of the meat, and greatly reducing the time and heat required to cure a batch of meat.

While the apparatuses and the method of air distribution performed thereby will be specifically described herein as adapted for the smoke-curing of meat and other foods, the apparatuses and the method in principle are effective to exchange heat or moisture between air and liquids or other solid products. For example, they may be used to refrigerate canned fruits or vegetables in solid or liquid form by substituting the heated smoke-laden air with cold air, or to dehydrate any liquid or solid product by the use of air alone at or below room temperature.

I will describe only one method of and two forms of apparatus for smoke-curing meats, each embodying my invention and will then point out the novel features thereof in claims.

In the accompanying drawings:

Fig. 1 is a view showing in end elevation, with portions thereof broken away, one form of smoke-curing apparatus embodying my invention.

Fig. 2 is a top plan view partly in section showing diagrammatically the apparatus of Fig. 1.

Fig. 3 is a vertical sectional view taken on the line 3—3 of Fig. 1.

Fig. 4 is a horizontal sectional view taken on the line 4—4 of Fig. 1.

Fig. 5 is a vertical sectional view taken on the line 5—5 of Fig. 2.

Fig. 6 is a view similar to Fig. 5 taken on the line 6—6 of Fig. 2.

Fig. 7 is a view similar to Fig. 6 taken on the line 7—7 of Fig. 2.

Figure 8:
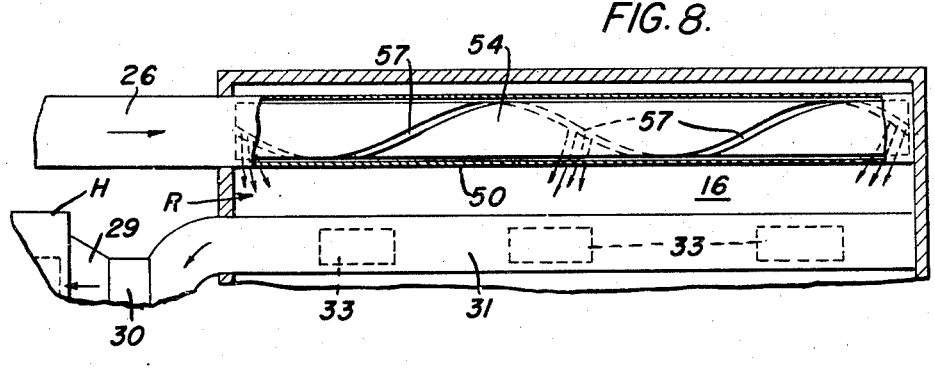
Fig. 8 is a view showing in horizontal section and as applied to the receptacle shown in Fig. 2 another form of air-distributing means embodying my invention.

Referring more particularly to the drawings and to Figs. 1 to 5 thereof the smoke-curing apparatus here shown comprises a receptacle or oven R of rectangular form which is provided with hinged doors 15 at one end thereof by which access may be had to curing chamber 16 for the introduction and removal of a meat carrier C. This carrier is suspended from the top wall 17 of the receptacle by a rail 18 on which rollers 19 are movable and carried by hangers 20 fixed to the top side of the carrier. The carrier C has racks 21 from which pieces of meat 22 are hung for curing.

Situated at one end of the receptacle R and at the top thereof is a housing H containing a combined air pressure and suction device D (see Fig. 2) in the form of a rotary blower driven by an electric motor 23a, and a conventional electric heating element E adjustable as to the temperature of heat produced thereby. Connected to the pressure side of the blower is an air outlet duct 24 which leads to a cross duct 25, and the ends of the latter communicate with one end of two identical distributing ducts 26 and 26a.

The ducts 26 and 26a extend lengthwise above the adjacent end wall 27 of the receptacle R and terminate at the door end of the receptacle where they are closed. Those portions of the ducts 26 and 26a coextensive in length with the top wall 27 are formed with tapered and depending portions providing outlets 28 which extend downwardly through the top wall at opposite sides of the carrier C.

To the suction side of the blower D is connected a duct 29 in which any conventional form of smoke generator 30 is contained. Leading from the opposite end of the duct 29 are a pair of exhaust ducts 31 which extend in spaced parallelism horizontally through the wall 27 and along the top wall 32 of the receptacle terminating at the door end of the receptacle. These ducts 31 are square in cross section and their bottom walls are formed at spaced intervals with inlet ports 33 controlled by valves 34 slidable in guides 35 to increase or decrease the effective size of the parts.

As best shown in Figs. 2 and 3 that portion of each distributing duct 26 or 26a disposed in the receptacle R is divided longitudinally into compartments 36 by transverse partitions 37 which at their upper edges terminate short of the ducts to provide passages 37a between the compartments. Rotatably mounted in the partitions and in the end walls of the receptacle R, is a shaft 38. Fixed to this shaft are fixed valves 39, 40 and 41, of butterfly form, there being one valve in each of the compartments 36. The arrangement of these valves circumferentially on that shaft 38 in the duct 26 is as illustrated in Figs. 5, 6, and 7, while the arrangement of the valves on the shaft in the duct 26a is the reverse thereof longitudinally of the shafts.

The two shafts 38 are adapted to be continuously driven in the same direction to effect rotation of the two sets of valves 39, 40 and 41 by means of an electric motor 42 supported on top of the receptacle R. Through a reduction gearing contained in a box 43 the motor drives a shaft 44 to which is fixed a sprocket 45. Other sprockets 46 are fixed to the shaft 38 where they project from the receptacle, and trained about these sprockets and the sprocket 45 is an endless chain 47.

In the operation of the apparatus, upon energizing the motors 23a and 42, the blower D draws air from the top of the chamber 16 through the ports 33 and into the ducts where it passes through the duct 29 containing the smoke generator 30 to pick up smoke in transit to the blower. As this smoke-laden air is emitted from the discharge or presure side of the blower it is heated by the element E to the temperature required to start curing of the meats 22 suspended in the chamber 16 through proper adjustment of such element.

From the housing H this heated and smoke-laden air is blown through the outlet duct 24 into the cross duct 25, and from the latter into and along the ducts 26 and 26a, to be finally emitted from the compartments 36 of the outlets 28 in a sequence as determined by operation of the two sets of valves 39, 40 and 41. Through operation of the motor 42, the shafts 38 are driven to rotate the valves for the duct 26 so that they are continuously opened and closed successively in the order in which they are numbered and first in one direction and then the other lengthwise of the duct, while the valves for the duct 26a are continuously opened and closed successively but in the reverse order in which they are numbered and first in one direction and then the other lengthwise of the duct 26a.

In the positions of the valves as illustrated in Fig. 2, air streams in full volume are discharged into opposite ends of the chamber 16 from the left-hand end of the outlet 28 for the duct 26, and the right-hand end of the outlet 28 for the duct 26a, as indicated by the arrows, since the valve 39 for the duct 26, and the valve 41 for the duct 26a are fully open. By continued turning of the shafts 38 the aforesaid valves 39 and 41 close and the valves 40 for both ducts fully open to admit air streams to the middle portion of the chamber 16. This is followed by closure of the valves 40 and opening of the valve 39 for the duct 26a and the valve 41 for the duct 26 to admit air streams to the other ends of the chamber.

Since the outlets 28 extend downwardly from the top of the chamber 16 at opposite sides of the meat carrier C, the heated and smoke-laden air streams emitted from the outlets will flow downwardly at opposite sides of the carrier, inwardly of such sides, and upwardly at the bottom of the carrier, all as indicated by the arrows in Fig. 1. By reason of this manner of air flow the meats suspended on the carrier are subjected to a combined heating and smoking treatment uniformly throughout, from start to finish of the curing process, it being understood that the temperature of the circulated air is by adjustment of the electrical heating element E, gradually increased from a starting temperature to a finishing temperature in which the meats are thoroughly cured without undue shrinkage of any pieces thereof, and in far less time than is possible under prior methods and apparatus for the reasons hereinbefore explained.

It will be understood that the air and smoke after being circulated in the chamber as described, are exhausted from the top of the chamber through the ports 33 and into the ducts 31 from whence they are returned to the duct 29 by the blower D, thus completing one cycle of air and smoke circulation.

The valves 34 are adapted to be adjusted to vary the effective size of the ports 33 at the time of installing the apparatus on a receptacle or oven, and the adjustment of these valves is determined by the shape and size of the oven. For example, in an oven of the rectangular shape and size shown in Fig. 2, the valves would be substantially fully opened to attain maximum air exhaust and hence minimum air distribution but sufficient to effect meat curing when the air reaches a finishing temperature. On the other hand, if the apparatus is applied to an oven chamber of square form and relatively large in area, the valves 34 will be partly closed to so restrict the exhaust of air from the chamber that a greater volume would be distributed in the chamber to insure it reaching all parts thereof before being exhausted therefrom.

Figure 9:
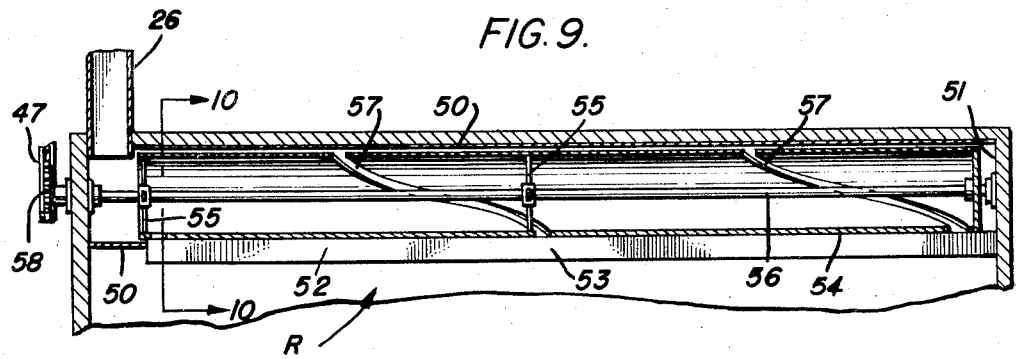
Fig. 9 is a vertical sectional view similar to Fig. 3 of the air-distributing means shown in Fig. 8.
Figure 10:
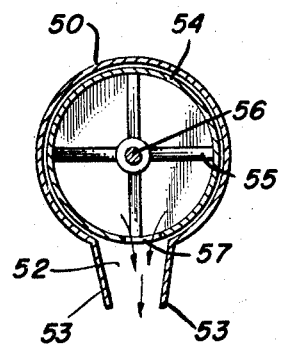
Fig. 10 is a vertical sectional view taken on the line 10—10 of Fig. 9.

Referring now to Figs. 8, 9 and 10, I have here shown another means of distributing heated and smoke-laden air to the chamber 16 in substitution for the valves 39, 40, 41 and while only one of such means is shown it will be understood that as applied to the receptacle or oven R two such means are employed and located in the top of the chamber 16 at opposite sides of the carrier C.

This air distributing means comprises a stationary circular duct 50 coextensive in length with the chamber 16 and closed at both ends, but adjacent one end is provided with an opening which in this instance communicates with the duct 26a. At its lower side the duct 50 is formed with an outlet slot 52 substantially coextensive in length therewith and bounded by depending and converging flanges 53.

Rotatably fitted in the duct 50 is an elongated cylindrical valve 54 which is supported on and fixed to spiders 55 spaced apart along the length of the valve and supporting in the centers thereof a shaft 56 for rotating the valve. The right hand end of the shaft 56 extends through the adjacent end wall of the duct 50 and is journalled in a suitable bearing on the confronting receptacle wall 51. The valve 54 is formed with a slot 57 extending spirally thereof and coextensive in length therewith.

The open end of the duct 50 is connected to the outlet end of the duct 26a as shown, and the projecting end of the shaft 56 is provided with a sprocket 58 which corresponds to one of the sprockets 46, and hence is adapted to be driven by the sprocket 45 through the chain 47 to drive the shaft 56.

In the operation of this air distributor driving of the shaft 56 rotates the valve 54 to cause the slot 57 to be brought into registration with the slot 52 successively along the length of the latter first in one direction and then the other longitudinally thereof. Thus with smoke-laden and heated air supplied under pressure to the duct 50 from the duct 26, such air will be delivered to the chamber 16 in a stream which travels back and forth from one end of the slot 52 to the other end.

With two such air distributors located in the chamber 16 in place of the two distributors in Fig. 2, and the valves 54 thereof adjusted circumferentially so that the slots 57 are spaced 180° apart, driving of the valves in the same direction admits smoke-laden and heated air streams simultaneously to opposite sides of the meat carrier C and in opposite directions longitudinally of the chamber 16. This results in distribution of such air uniformly throughout the oven chamber to attain the same advantages as described in connection with the apparatus shown in Figs. 1 and 2.

What I claim is:

1. An apparatus for smoke-curing meats, including: a receptacle in which the meats are adapted to be hung; combined pressure and suction means for supplying smoke and heated air under pressure to the receptacle, withdrawing the same therefrom, and reheating and returning the smoke and air under pressure to the receptacle; valved means so controlling the supply of heated air and smoke to the receptacle from said means that they are admitted to the receptacle simultaneously at opposite sides of the meats therein and successively in opposite directions along the meats, said valve means comprising two ducts each having a radial outlet, two tubular valves rotatably mounted in said ducts and having spiral slots therein; means for rotating said valves whereby said slots are caused to open and close said outlets progressively along the length thereof; and valves controlling the exhaust of air and smoke from the receptacle.

2. In an apparatus of the character described; a receptacle; means for supplying a fluid under pressure to the receptacle, a duct having a fluid inlet at one end and a fluid outlet slot longitudinal therein; a shaft rotatable in the duct; and a plurality of valves fixed in a spiral arrangement on the shaft, and operating when the shaft is rotated to successively open and close said outlet along its length.

References Cited in the file of this patent

UNITED STATES PATENTS

| | | |
|---|---|---|
| 2,312,339 | Jones | Mar. 2, 1943 |
| 2,352,590 | Trinkle | June 27, 1944 |
| 2,505,973 | Julian | May 2, 1950 |
| 2,596,381 | Doty | May 13, 1952 |
| 2,625,095 | Julian | Jan. 13, 1953 |
| 2,640,414 | Jensen | June 2, 1953 |